United States Patent
Craik

(10) Patent No.: US 9,280,836 B1
(45) Date of Patent: Mar. 8, 2016

(54) TECHNIQUES FOR RENDERING IMAGES IN A TILED VIEW

(71) Applicant: Google Inc., Mountain View, CA (US)

(72) Inventor: Christopher Jason Craik, Berkeley, CA (US)

(73) Assignee: Google Inc., Mountain View, CA (US)

( * ) Notice: Subject to any disclaimer, the term of this patent is extended or adjusted under 35 U.S.C. 154(b) by 454 days.

(21) Appl. No.: 13/655,248

(22) Filed: Oct. 18, 2012

Related U.S. Application Data

(60) Provisional application No. 61/548,684, filed on Oct. 18, 2011.

(51) Int. Cl.
*G06T 11/00* (2006.01)

(52) U.S. Cl.
CPC ...................................... *G06T 11/00* (2013.01)

(58) Field of Classification Search
CPC ............ G06T 11/00; G06T 1/00; G09G 5/00; G09G 5/02
USPC .......................................................... 345/619
See application file for complete search history.

(56) References Cited

U.S. PATENT DOCUMENTS

| 2001/0033303 | A1* | 10/2001 | Anderson | 345/854 |
| 2007/0252834 | A1* | 11/2007 | Fay | 345/428 |
| 2008/0079972 | A1* | 4/2008 | Goodwin et al. | 358/1.12 |
| 2009/0100373 | A1* | 4/2009 | Pixley et al. | 715/786 |
| 2013/0162678 | A1* | 6/2013 | Harris | 345/634 |

\* cited by examiner

*Primary Examiner* — Barry Drennan
*Assistant Examiner* — Brian Kravitz
(74) *Attorney, Agent, or Firm* — Remarck Law Group PLC

(57) ABSTRACT

A computer-implemented technique includes determining whether to first render an image at a first quality or a second quality based on whether a viewable portion of the image is moving within an image space, a second quality being less than the first quality. The technique further includes first rasterizing the image at the first or second quality based on the determination and first rendering the image at the first or second quality based on the determination. Additionally, the technique includes second rasterizing the image at the other of the first or second quality based on the determination and second rendering the image at the other of the first or second quality based on the determination.

20 Claims, 3 Drawing Sheets

TECHNIQUES FOR RENDERING IMAGES IN A TILED VIEW

CROSS-REFERENCE TO RELATED APPLICATIONS

This application claims the benefit of U.S. Provisional Application No. 61/548,684, filed on Oct. 18, 2011. The entire disclosure of the above application is incorporated herein by reference.

FIELD

The present disclosure relates to computing devices and, more particularly, to techniques for rendering images on a display of a computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A "user device" generally refers to a computing device that includes a user interface, a display, and a processor. User devices may include non-portable or stationary devices such as desktop computers, as well as mobile devices such as mobile phones, tablet computers, and the like. User devices can be utilized to display an image. The user device may display a blank or other default screen while waiting for the image to be fully rendered such that the user experience is diminished.

SUMMARY

A computer-implemented method can include receiving, at a computing device, image data corresponding to an image to be displayed on a display of the computing device. The method can further include partitioning, at the computing device, the image into one or more first image tiles, the one or more first image tiles being at a first quality. Additionally, the method can include partitioning, at the computing device, the image into one or more second image tiles, the one or more second image tiles being at a second quality less than the first quality. The method can also include determining, at the computing device, a first set of the one or more first image tiles and a second set of the one or more second image tiles based on a location of a viewable portion of the image within an image space. The method can further include determining, at the computing device, a priority of rasterizing the first set and the second set based on user input, the user input indicating whether the viewable portion of the image is moving within the image space. Further, the method can include rasterizing, at the computing device, one of the first set and the second set based on the priority to obtain a first rasterized image, and rendering, on the display of the computing device, the viewable portion of the first rasterized image. Also, the method can include rasterizing, at the computing device, the other one of the first set and the second set based on the priority to obtain a second rasterized image, and rendering, on the display of the computing device, the viewable portion of the second rasterized image.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
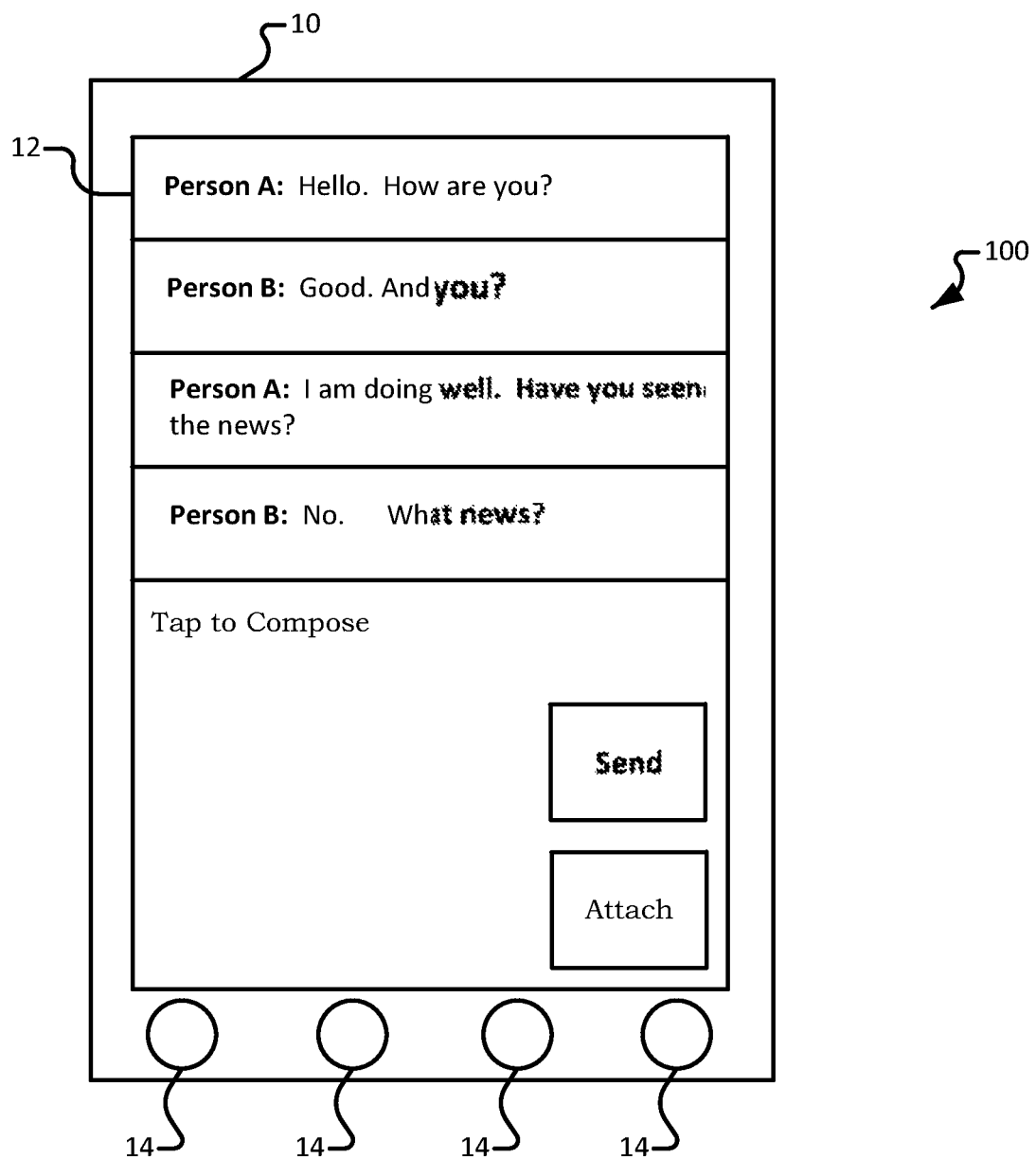
FIG. 1A is a schematic illustration of an example user device displaying a viewable portion of an image according to some implementations of the present disclosure.
Figure 1B:
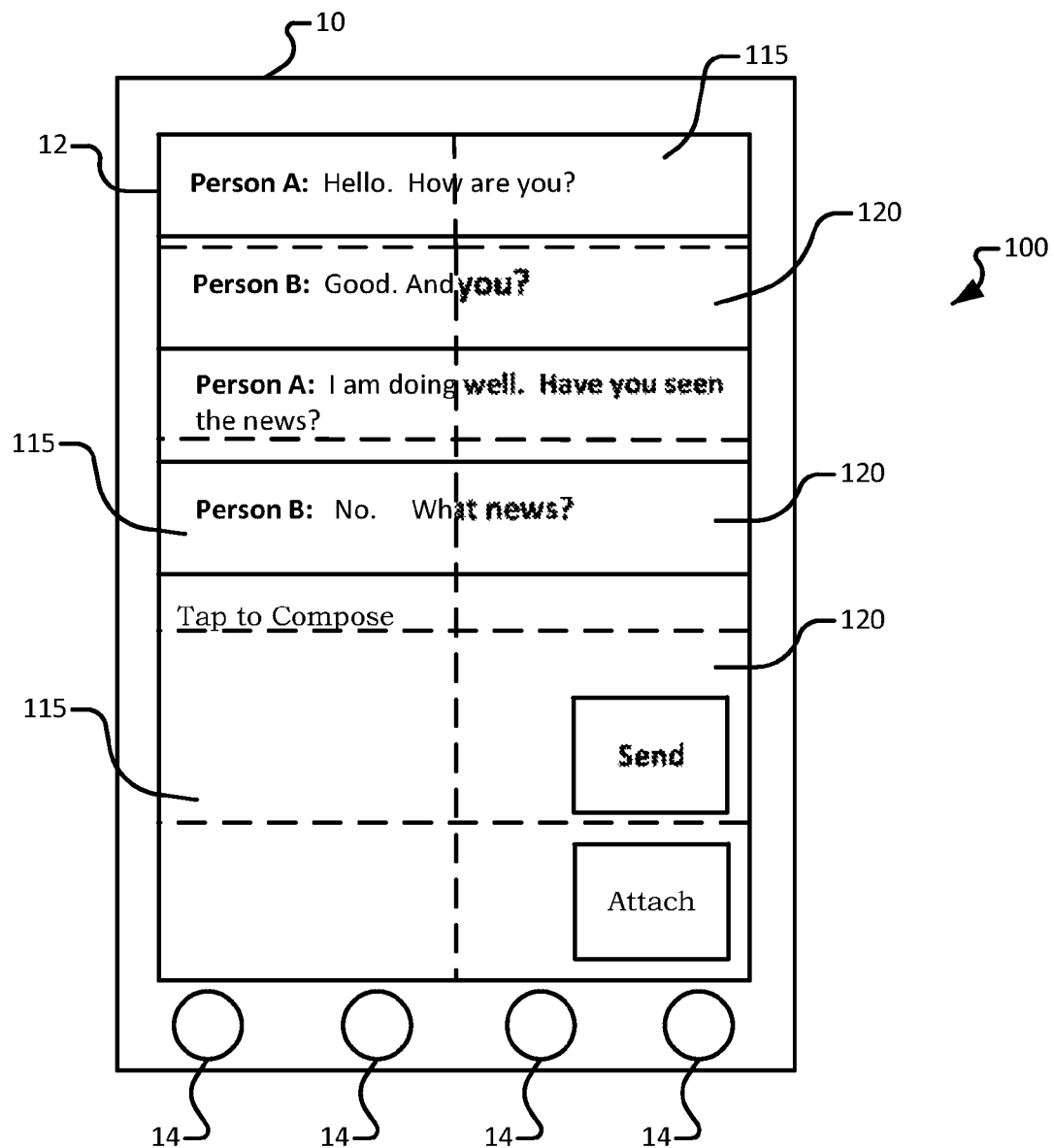
FIG. 1B is a schematic illustration of the example user device of FIG. 1A showing first and second image tiles according to some implementations of the present disclosure.

Referring now to FIGS. 1A and 1B, a schematic illustration of a user device 10 according to some embodiments of the present disclosure is shown. The user device 10 may include a processor (not shown), a display 12 and one or more input devices such as input buttons 14. While the user device 10 is illustrated in FIGS. 1A and 1B as a tablet computer, one will appreciate that the user device 10 may be any form of computing device (a desktop computer, laptop computer, mobile phone, etc.).

The user device 10 can obtain image data for display, for example, via a network connection, a stored data file or the like. The image data may be processed by the user device 10 to render an image 100 to display on the display 12, for example, through the use of a web browser or other application. It should be appreciated that obtaining image data is specifically meant to include, but is not limited to, a situation in which data that is stored the user device 10 (such as, in a memory) is retrieved and processed to generate an image 100 for display.

In some embodiments, the image 100 may be rendered in non-overlapping portions (or "tiles") such that one or more of these tiles can be displayed while waiting for the remaining tiles of the image 100 to be rendered. The portion of the image 100 that is being displayed on the display 12 will be referred to as the "viewable portion" of the image 100. The viewable portion can be of any size and be located at any location within the image space. In some situations, the viewable portion can include the entire image space of the image 100.

Upon receiving an instruction, the user device 10 may begin rendering the image 100 based on the image data. In some embodiments, the user device 10 may partition the image 100 into one or more first image tiles 115 at a first quality and one or more second image tiles 120 at a second quality. The second quality may be a lower quality than the first quality such that the first image tiles 115 can be referred to as "high quality tiles" and the second image tiles 120 can be referred to as "low quality tiles." One will appreciate that the terms "high quality tiles" and "low quality tiles" are merely descriptive of the relationship between the quality of the first image tiles 115 and the second image tiles 120 and do not describe any relation to a specific quality or resolution standard/threshold. By partitioning the image 100 into first and second image tiles 115, 120, the image 100 can be displayed at both a high quality (by displaying the first image tiles 115)

and a low quality (by displaying the second image tiles 120), as described more fully below.

In some embodiments, the user device 10 can determine a first set of the first image tiles 115 and a second set of the second image tiles 120 based on the location of the viewable portion within the image space. The first set can include the first image tiles 115 that correspond to the viewable portion. In other words, the first set can include those first image tiles 115 that are at least partially within the viewable portion of the image 100. Similarly, the second set can include the second image tiles 120 that correspond to the viewable portion, i.e., the second set can include those second image tiles 120 that are at least partially within the viewable portion of the image 100. In this manner, the user device 10 can begin rendering of the first and/or second sets of image tiles 115, 120 in order to provide at least a partial display of the image 100 on the display 12. As shown in FIG. 1B, both the first image tiles 115 and the second image tiles 120 can be displayed at the same time.

As described above, the user device 10 may render both the first and second image tiles 115, 120 at the same time. In some embodiments, the first image tiles 115 (at the higher quality) can be displayed "on top" of the second image tiles 120. In these embodiments, when both the first and second image tiles 115, 120 are rendered, the first image tiles 115 will be visible to a user, i.e., the first image tiles 115 will obscure the second image tiles 120. The display of the first image tiles 115 "on top" of the second image tiles 120 is specifically meant to include, but is not limited to, hiding the second image tiles 120 in the background such that the second image tiles 120 are not viewable by the user when both the first and second image tiles 115, 120 are rendered.

In order to provide a pleasing user experience, the user device 10 may alternate between displaying the first image tiles 115 and the second image tiles 120. In some embodiments, the user device 10 may determine a priority of rasterizing the first set of first image tiles 115 and the second set of second image tiles 120. For example only, when the viewable portion of the image 100 is static (not moving), the user device 10 may prioritize the rasterizing of the first image tiles 115 (at the higher quality) before rasterizing the second image tiles 120 to obtain a first rasterized image, which is then displayed. In this manner, the user device 10 can display the viewable portion of image 100 at the higher quality with a shorter delay.

Furthermore, as described above, in order to provide a shorter delay, the user device 10 can prioritize the rasterizing of the first set (the first image tiles 115 tiles that are visible within the viewable portion of the image 100) before rasterizing the second set such that a user can see the portion of the image 100 in which they are interested more quickly and while the remainder of the image 100 is being rendered. In some embodiments, if the priority indicates that the first image tiles 115 (at the higher quality) should be rasterized before rasterizing the second image tiles 120, the user device 10 may not rasterize and/or render the second image tiles 120. Thus, if the priority indicates that the higher quality tiles should be rendered before the lower quality tiles, the user device 10 may skip the rasterizing and rendering of the lower quality tiles altogether.

In some embodiments, the user device 10 can determine a third set of the first image tiles 115 and a fourth set of the second image tiles 120 based on the location of the viewable portion within the image space. The third set can include the first image tiles 115 that correspond to an area proximate to but not within the viewable portion. In other words, the third set can include those first image tiles 115 that are just outside of the viewable portion of the image 100. Similarly, the fourth set can include the second image tiles 120 that correspond to an area proximate to but not within the viewable portion, i.e., the fourth set can include those second image tiles 120 that are just outside of the viewable portion of the image 100. In this manner, the user device 10 can prioritize the rendering of the first, second, third and fourth sets based on user input, as described more fully below.

Depending on the processing capabilities of the user device 10, rasterizing the first image tiles 115 while the viewable portion of the image 100 is moving within the image space may be impractical or difficult. Thus, in order to provide a pleasing user experience, the user device 10 may prioritize the rasterizing of the second image tiles 120 (at the lower quality) before the rasterizing of the first image tiles 115 to obtain a first rasterized image, which is then rendered in order to provide the user with a displayed image 100—even if at a lower quality than desired—instead of a blank or default screen. In this manner, the user device 10 can display the viewable portion of image 100 at the lower quality with little or no delay. Furthermore, as described above, in order to provide a shorter delay, the user device 10 can prioritize the rasterizing of the second set (the second image tiles 120 tiles that are visible within the viewable portion of the image 100) before rasterizing of the first set such that a user can see the portion of the image 100 in which they are interested more quickly and while the remainder of the image 100 is being rasterized.

In some embodiments, the user device 10 can continue to rasterize the first image tiles 115 and the second image tiles 120 until the entire image 100 is rasterized. As described above, the first image tiles 115 (at the higher quality) can be displayed on top of the second image tiles 120 (at the lower quality) such that the image 100 can be displayed at the higher quality when the rendering process is complete.

Additionally or alternatively, the user device 10 can prioritize the rendering of the first, second, third and fourth sets of image tiles 115, 120 based on whether while the viewable portion of the image 100 is moving within the image space (e.g., when a user is scrolling the image within the display). For example only, when the viewable portion of the image 100 is moving within the image space, the priority may indicate to first rasterize and render the second set of second image tiles 120 (the lower quality image tiles at least partially within the viewable portion), then the fourth set of second image tiles 120 (the lower quality image tiles just outside of the viewable portion), then the first set of first image tiles 115 (the higher quality image tiles at least partially within the viewable portion), and then the third set of first image tiles 115 (the higher quality image tiles just outside of the viewable portion). When the viewable portion of the image 100 is not moving within the image space, the priority may indicate to first rasterize and render the first set of first image tiles 115 (the higher quality image tiles at least partially within the viewable portion), then the third set of first image tiles 115 (the higher quality image tiles just outside of the viewable portion), then the second set of second image tiles 120 (the lower quality image tiles at least partially within the viewable portion), and then the fourth set of second image tiles 120 (the lower quality image tiles just outside of the viewable portion). In some embodiments, when the viewable portion of the image 100 is not moving within the image space, the user device 10 may not rasterize and render any of the second image tiles 120 (the lower quality image tiles), as described above.

The rasterizing and rendering of the image 100 can be an on-going process, for example, when updates to the image 100 are received or when rendering an animated GIF or similar image 100. Thus, it should be appreciated that updating the image tiles 115, 120 may be performed by the user device 10 based on an indication of priority, as described herein. When transitioning from the viewable portion of the image 100 moving within the image space to a static viewable portion, the user device 10 may block the updating of the second image tiles 120 (the lower quality image tiles) such that a user can see the higher quality image 100 in which they are interested more quickly.

Figure 2:
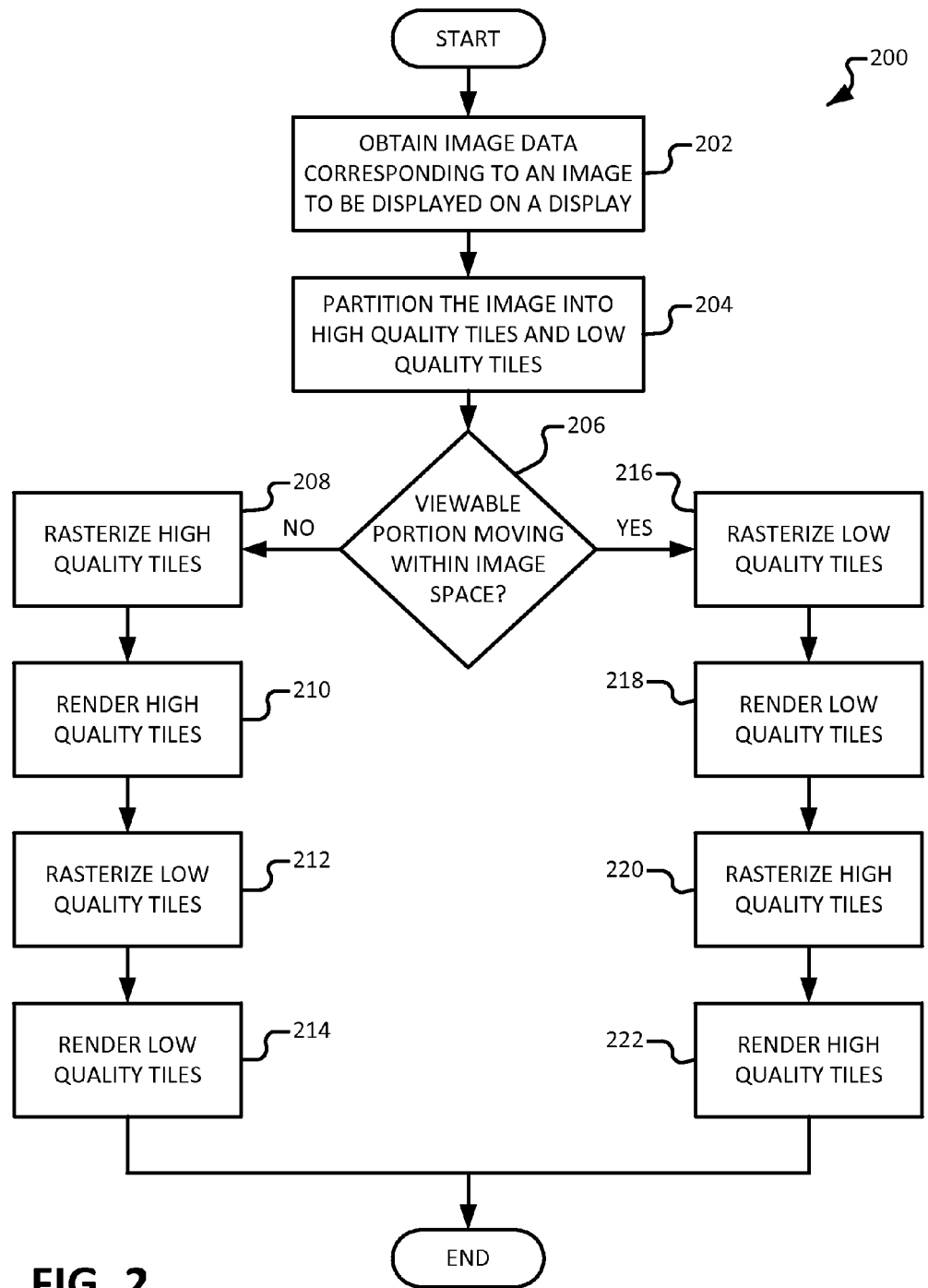
FIG. 2 is a flow diagram of a technique for rendering images in a tiled view according to some implementations of the present disclosure.

Referring now to FIG. 2, a flow diagram of a technique 200 for rendering images in a tiled view according to some implementations of the present disclosure is illustrated. At 202, the user device 10 can obtain image data corresponding to an image to be displayed on the display 12. The image can be partitioned into high quality tiles (first image tiles 115) and low quality tiles (second image tiles 120) at 204. At 206, if the viewable portion is static, i.e., not moving within the image space, the user device 10 can determine the priority to rasterize the high quality tiles (first image tiles 115) before the low quality tiles (second image tiles 120). The user device 10 can first rasterize (208) and render (210) the high quality tiles (first image tiles 115), and then rasterize (212) and render (214) the low quality tiles (second image tiles 120). Alternatively, the user device 10 can rasterize (208) and render (210) the high quality tiles (first image tiles 115) without then rasterizing and rendering the low quality tiles (second image tiles 120).

If, at 206, the viewable portion is moving within the image space, the user device 10 can determine the priority to rasterize the low quality tiles (second image tiles 120) before the high quality tiles (first image tiles 115). The user device 10 can first rasterize (216) and render (218) the low quality tiles (second image tiles 120), and then rasterize (220) and render (222) the high quality tiles (first image tiles 115).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
   obtaining, at a computing device, image data corresponding to an image to be displayed on a display of the computing device;
   partitioning, at the computing device, the image into one or more first image tiles, the one or more first image tiles being at a first quality;
   partitioning, at the computing device, the image into one or more second image tiles, the one or more second image tiles being at a second quality less than the first quality;
   determining, at the computing device, a first set of the one or more first image tiles and a second set of the one or more second image tiles based on a location of a viewable portion of the image within an image space;
   determining, at the computing device, a priority of rasterizing the first set and the second set based on user input, wherein the priority indicates to rasterize the first set before rasterizing the second set when the user input indicates that the image is not moving within the image space and the priority indicates to render the second set before rasterizing the first set when the user input indicates that the image is moving within the image space;
   when the priority indicates to rasterize the first set before rasterizing the second set:
   rasterizing, at the computing device, the first set to obtain a first rasterized image, and
   rendering, on the display of the computing device, the viewable portion of the first rasterized image; and
   when the priority indicates to rasterize the second set before rasterizing the first set:
   rasterizing, at the computing device, the second set to obtain a second rasterized image,
   rendering, on the display of the computing device, the viewable portion of the second rasterized image,
   rasterizing, at the computing device, the first set to obtain the first rasterized image, and
   rendering, on the display of the computing device, the viewable portion of the first rasterized image.

2. The method of claim 1, wherein the first set is displayed on top of the second set such that the first rasterized image is visible to a user when both the first and second rasterized images are rendered.

3. The method of claim 2, wherein the first rasterized image obscures the second rasterized image such that the second rasterized image is not visible to the user.

4. The method of claim 1, wherein, when the priority indicates to rasterize the second set before rasterizing the first set, rendering, on the display of the computing device, the viewable portion of the first rasterized image comprises replacing the viewable portion of the second rasterized image with the first rasterized image.

5. The method of claim 1, further comprising, when the first set comprises a subset of the first image tiles, rasterizing a remainder of the first image tiles, the remainder of the first image tiles including the first image tiles not included in the first set.

6. The method of claim 5, further comprising rendering at least a portion of the remainder of the first image tiles when the portion of the remainder of the first image tiles is within the viewable portion.

7. The method of claim 6, further comprising, when the second set comprises a subset of the second image tiles, rasterizing a remainder of the second image tiles, the remainder of the second image tiles including the second image tiles not included in the second set.

8. The method of claim 7, further comprising rendering at least a portion of the remainder of the second image tiles when the portion of the remainder of the second image tiles is within the viewable portion.

9. A computer-implemented method comprising:
   determining, at a computing device, whether to first rasterize an image at a first quality or a second quality based on whether a viewable portion of the image is moving within an image space, a second quality being less than the first quality;
   first rasterizing, at the computing device, the image at the first or second quality based on the determination;
   first rendering, at the computing device, the image at the first or second quality based on the determination;

second rasterizing, at the computing device, the image at the other of the first or second quality based on the determination; and second rendering, at the computing device, the image at the other of the first or second quality based on the determination, wherein the first rasterizing is at the first quality and the second rasterizing is at the second quality when the viewable portion of the image is not moving within the image space, and wherein the first rasterizing is at the second quality and the second rasterizing is at the first quality when the viewable portion of the image is moving within the image space.

10. The method of claim 9, wherein, when the image is rasterized and rendered at both the first and second qualities, the image at the first quality is rendered on top of the image at the second quality set such that the image at the first quality is visible to a user.

11. The method of claim 10, wherein the image at the first quality obscures the image at the second quality such that the image at the second quality is not visible to the user.

12. The method of claim 9, further comprising:
partitioning, at the computing device, the image into one or more first image tiles, the one or more first image tiles being at the first quality; and
partitioning, at the computing device, the image into one or more second image tiles, the one or more second image tiles being at the second quality; and
determining, at the computing device, a first set of the one or more first image tiles and a second set of the one or more second image tiles based on a location of the viewable portion of the image within the image space,
wherein:
the first rasterizing the image at the first or second quality based on the determination comprises rasterizing the first set or the second set, respectively,
the first rendering the image at the first or second quality based on the determination comprises rendering the first set or the second set, respectively,
the second rasterizing the image at the other of the first or second quality based on the determination comprises the other of the first set or second set, and
the second rendering the image at the other of the first or second quality based on the determination comprises displaying the other of the first set or second set.

13. A computing device, comprising:
a display;
at least one processor coupled to the display; and
a non-transitory computer-readable storage medium storing executable computer program code, the at least one processor configured to execute the executable computer program code to perform operations including:
receiving, at a computing device, image data corresponding to an image to be displayed on a display of the computing device;
partitioning, at the computing device, the image into one or more first image tiles, the one or more first image tiles being at a first quality;
partitioning, at the computing device, the image into one or more second image tiles, the one or more second image tiles being at a second quality less than the first quality;
determining, at the computing device, a first set of the one or more first image tiles and a second set of the one or more second image tiles based on a location of a viewable portion of the image within an image space;
determining, at the computing device, a priority of rasterizing the first set and the second set based on user input, wherein the priority indicates to rasterize the first set before rasterizing the second set when the user input indicates that the image is not moving within the image space and wherein the priority indicates to rasterize the second set before rasterizing the first set when the user input indicates that the image is moving within the image space;
when the priority indicates to rasterize the first set before rasterizing the second set:
rasterizing, at the computing device, the first set to obtain a first rasterized image, and
rendering, on the display of the computing device, the viewable portion of the first rasterized image; and
when the priority indicates to rasterize the second set before rasterizing the first set:
rasterizing, at the computing device, the second set to obtain a second rasterized image,
rendering, on the display of the computing device, the viewable portion of the second rasterized image,
rasterizing, at the computing device, the first set to obtain the first rasterized image, and
rendering, on the display of the computing device, the viewable portion of the first rasterized image.

14. The computing device of claim 13, wherein, when the priority indicates to rasterize the second set before rasterizing the first set, rendering, on the display of the computing device, the viewable portion of the first rasterized image comprises replacing the viewable portion of the second rasterized image with the first rasterized image.

15. The computing device of claim 13, wherein the first set is rendered on top of the second set such that the first rasterized image is visible to a user when both the first and second rasterized images are displayed.

16. The computing device of claim 15, wherein the first rasterized image obscures the second rasterized image such that the second rasterized image is not visible to the user.

17. The computing device of claim 13, wherein the operations further comprise, when the first set comprises a subset of the first image tiles, rasterizing a remainder of the first image tiles, the remainder of the first image tiles including the first image tiles not included in the first set.

18. The computing device of claim 17, wherein the operations further comprise rendering at least a portion of the remainder of the first image tiles when the portion of the remainder of the first image tiles is within the viewable portion.

19. The computing device of claim 18, wherein the operations further comprise, when the second set comprises a subset of the second image tiles, rasterizing a remainder of the second image tiles, the remainder of the second image tiles including the second image tiles not included in the second set.

20. The computing device of claim 19, wherein the operations further comprise rendering at least a portion of the remainder of the second image tiles when the portion of the remainder of the second image tiles is within the viewable portion.

* * * * *